US005417794A

United States Patent [19]

Menayan

[11] Patent Number: 5,417,794

[45] Date of Patent: May 23, 1995

[54] APPARATUS FOR SIMULTANEOUSLY DISPOSING TUBULAR LABELS ON A PLURALITY OF BOTTLES OR OTHER CONTAINERS

[75] Inventor: Victor V. Menayan, Cary, N.C.

[73] Assignee: Venture Packaging, Inc., Charlotte, N.C.

[21] Appl. No.: 213,506

[22] Filed: Feb. 22, 1994

Related U.S. Application Data

[63] Continuation of Ser. No. 918,211, Jul. 21, 1992, abandoned.

[51] Int. Cl.⁶ .............. B32B 31/00

[52] U.S. Cl. .............. 156/362; 53/291; 156/86; 156/568

[58] Field of Search .............. 156/86, 350, 362, 566, 156/568; 53/290, 291, 292, 295, 296, 297, 298, 367, 419, 442, 487, 557

[56] References Cited

U.S. PATENT DOCUMENTS

| | | | |
|---|---|---|---|
| 2,826,884 | 3/1958 | Eddison et al. | 53/295 |
| 3,852,940 | 12/1974 | Kinoshita | 53/295 |
| 3,959,065 | 5/1976 | Ashcroft | 53/557 |
| 4,011,122 | 3/1977 | Ashcroft | 53/442 |
| 4,102,728 | 7/1978 | Smith | 156/443 |
| 4,104,845 | 8/1978 | Hoffmann | 53/410 |
| 4,148,171 | 4/1979 | Westlund | 53/291 |
| 4,412,876 | 11/1983 | Lerner et al. | 53/291 |
| 4,565,592 | 9/1986 | Wehrmann et al. | 156/64 |
| 4,620,888 | 11/1986 | Easter et al. | 156/86 |
| 4,694,633 | 9/1987 | Fujio et al. | 156/86 |
| 4,944,825 | 7/1990 | Gifford et al. | 156/86 |

FOREIGN PATENT DOCUMENTS

| | | | |
|---|---|---|---|
| 2529973 | 1/1977 | Germany | 53/291 |

*Primary Examiner*—David A. Simmons
*Assistant Examiner*—Paul M. Rivard
*Attorney, Agent, or Firm*—Shefte, Pinckney & Sawyer

[57] ABSTRACT

An apparatus for simultaneously disposing tubular labels on a plurality of bottles or other containers includes an assembly for advancing the bottles or other containers along an endless travel path. The apparatus also includes a plurality of tubular label applying stations each operable to individually apply a tubular label onto a bottle or other container as the bottle or other container is advanced along the travel path. The advancing assembly is preferably in the form of a rotating plate supporting the bottles or other containers thereon at uniform angular spacings from one another and the tubular label applying stations are preferably also supported on the rotating plate. A cam and cam follower arrangement is utilized for controlling each tubular label applying station to perform its label applying operation in coordination with the advancing movement of its associate bottle or other container.

18 Claims, 11 Drawing Sheets

APPARATUS FOR SIMULTANEOUSLY DISPOSING TUBULAR LABELS ON A PLURALITY OF BOTTLES OR OTHER CONTAINERS

CROSS REFERENCE TO RELATED APPLICATION

The present application is a continuation of application Ser. No. 07/918,211, filed Jul. 21, 1992, which is expressly abandoned upon the granting of a filing date to the present continuation application.

BACKGROUND OF THE INVENTION

The present invention relates to an apparatus for simultaneously disposing tubular labels on a plurality of bottles or containers and, more particularly, to an apparatus for disposing tubular or endless sleeve labels of the type which are supplied from a roll.

Sleeves or tubular labels having an endless shape have shown themselves to be particularly attractive for use as labels for bottles or containers. Such sleeves or tubular labels are most typically pre-printed plastic labels formed from thin flexible plastic film and these printed labels, commonly referred to as sleeve labels or tubular labels, have found wide use as labels for blow-molded plastic containers such as, for example, multi-liter soft drink bottles, other beverage bottles, and detergent chemical containers.

Tubular labels have proved to be cost effective as compared with other labeling techniques such as, for example, silk screen labeling techniques or adhesive label techniques, and one reason for this result has been the development of apparatus for automatically disposing such tubular labels on bottles or other containers, which minimize some of the labor-intensive steps typically involved in other label applying techniques. U.S. Pat. No. 4,944,825 discloses an apparatus for applying tubular labels to product containers, which includes a labeling assembly, a drive system for actuating the labeling assembly, and an assembly for advancing product containers to a label applying position. The labeling assembly is operable to repetitively separate individual tubular labels from a web comprised of tubular labels separably connected to one another. The labeling assembly is driven through a label applying stroke in which the assembly effects separation of the next available tubular label from the supply web of labels, draws the tubular label over a guide horn which opens the tubular label, and then draws the opened tubular label onto the product container. Before commencing its return stroke, the labeling assembly releases the tubular label which label contracts under its inherent bias and assumes a generally fixed mounted position on the product container.

As each product container is provided with a tubular label, the product container can then be discharged from the label applying position and the next product container awaiting labeling can be subsequently advanced into the label applying position. If a product container, especially one which is filled, is fed to the label applying position at too fast a rate, instability of the product container may occur, leading to movement of the product container to an extent that it may not be properly positioned for receiving its tubular label. The feeding and discharge of product containers into and out of the label applying position thus represents one step of the label applying process whose time requirements can only be reduced to a predetermined minimum level, regardless of the operating speed of the labeling assembly in performing other steps such as separating, opening, and inserting a tubular label on the product container.

Moreover, the driving movement of the labeling assembly through its label applying stroke and in the opposite direction along its return stroke cannot exceed a predetermined rate for the reason that incomplete opening and/or undesired plastic deformation of the tubular label may occur. Specifically, since the driving movement of the labeling assembly in its label applying stroke effects separation of the engaged tubular label along the separable connectors (e.g., perforations) between the engaged tubular label and the next following tubular label on the supply web, the rate of movement of the labeling assembly during the separation phase must be accomplished at a controlled rate so that plastic deformation of the tubular label (such as, for example, permanent axial elongation) does not occur due to a lag in the separation of the labels relative to the downward movement of the engaged tubular label. If the labeling assembly pulls the engaged tubular label at too fast a rate while the next succeeding tubular label is clamped during the perforation separating phase, one or both of the labels may stretch (e.g., axial elongation) beyond an elastic limit, thereby resulting in tearing or permanent plastic deformation of the tubular label.

Efforts to increase the efficiency of the tubular label applying operation have led to the development of one arrangement in which several tubular label applying apparatus are arranged together, with all of the apparatus receiving containers from a common feed device such as, for example, a linear conveyor. However, difficulties arise in reliably pre-positioning each group of product containers in the respective feed position at which they are fed in groupwise manner to the group of automatic tubular label applying apparatuses.

U.S. Pat. No. 4,694,633 to Fujio et al discloses a film wrapping machine for wrapping film around articles. Although the films do not have an endless shape such as a tubular label, the film wrapping machine disclosed in the Fujio et al patent is operable to apply film to a plurality of articles during movement of the articles between a feed location and the discharge location. The film wrapping machine includes a rotary turntable assembly supporting the articles at uniform spacings circumferentially about the rotary turntable assembly. A film supply unit supplies film to a film retaining member associated with each article during passage of the article past the film supply unit. The film retaining member associated with each article then applies the film in encircling relation about the article as the article continues to be advanced by the rotation of the rotary turntable assembly. However, due their endless shape, tubular labels must be moved axially over an article or container to apply the tubular label thereto and the Fujio et al film wrapping machine does not discloses a structure for applying a label of endless shape.

Accordingly, efforts to increase the speed at which automatic tubular label applying apparatus operate have been tempered by the reality that the rate at which product containers can be fed to, and discharged from, the label applying apparatus, and the rate at which tubular labels can be reliably separated from a supply web, inherently limit any significant increases in the production rate of the label applying apparatus.

SUMMARY OF THE INVENTION

It is accordingly one object of the present invention to provide an apparatus which advantageously allows increases in the rates at which tubular labels can be applied to bottles and other containers without significantly heightening the risk of improperly positioned bottles or other containers at the label applying position. This object is achieved by an apparatus for applying tubular labels having the capability to advance the bottles or other containers along a common path while simultaneously controlling a plurality of label applying stations to dispose labels on the advancing bottles or other containers.

Briefly described, the present invention provides an apparatus for disposing a sleeve in encircling relation on an article unit, the sleeve having an endless shape and being normally in an incompletely opened condition, and each sleeve being openable from its normal incompletely opened condition into an opened condition for insertion of the sleeve onto an article unit. The apparatus includes an arrangement for advancing article units along a travel path during the disposition of sleeves thereon and a plurality of sleeve disposing stations, each for individually disposing a sleeve on an article unit during advancing movement of the article unit along the travel path, each sleeve disposing station being operable to perform a sleeve disposing operation in which the sleeve disposing station engages a sleeve, expands the sleeve from its normal incompletely opened condition into an opened condition, positions the opened sleeve relative to an article unit for subsequent release thereonto, and releases the sleeve to assume an encircling mounted position on the article unit.

Additionally, the sleeve disposing apparatus includes an arrangement for displacing each sleeve disposing station to travel with an associated article unit during the advancing movement of the associated article unit along the travel path such that the sleeve disposing station is maintained in sleeve disposing position relative to the associated article unit. Also, the apparatus includes a system for controlling each sleeve disposing station to perform a sleeve disposing operation by which a sleeve is disposed on the associated article unit during travel of the sleeve disposing station with the associated article unit, whereby a sleeve is disposed on each article unit by one of the sleeve disposing stations during the advancing movement of the article unit along the travel path.

In the preferred embodiment of the apparatus, the article unit advancing unit includes a mechanism for advancing for the article units along an endless travel path. Also, the control system preferably includes an arrangement for driving each sleeve disposing apparatus through its sleeve disposing operation in response to the movement of the sleeve disposing apparatus by the displacing system.

According to further features of the preferred embodiment of the apparatus, each sleeve disposing arrangement includes an assembly for releasably maintaining a sleeve in an opened condition and the control system means includes a plurality of stroke path movement devices for cyclically moving a releasably maintaining assembly along a stroke path between a receipt position at which the releasably maintaining assembly receives a sleeve and a release position at which the releasably maintaining assembly releases the sleeve to assume its encircling mounted position on an article unit. Additionally, the control system preferably includes a subsystem for controlling each stroke path movement device to cyclically move its associated releasably maintaining assembly between its receipt position and its release position in response to the displacing movement of the respective sleeve disposing apparatus.

According to additional details of the preferred embodiment of the apparatus, the mechanism for advancing articles along a travel path includes a rotatable support assembly having a plurality of individual article unit support positions uniformly circumferentially spaced from one another along a circle and for rotating the rotatable support assembly, each individual article unit support position for supporting a respective article unit during rotating movement of the rotatable support whereby the travel path of the article units is an annular travel path. Furthermore, in connection with the feature of the rotatable support assembly, the system for displacing each sleeve disposing station includes station support device for supporting the sleeve disposing stations on the rotatable support assembly in sleeve disposing relation with the articles supported on the rotatable support assembly.

Additionally, in connection with the feature of the rotatable support assembly, the control system preferably includes a cam, and each stroke path movement device preferably includes a cam follower connected to the associated releasably maintaining assembly and a mechanism for guiding the associated releasably maintaining assembly during its movement between its receipt position and its release position. Each cam follower is operable to follow the cam during displacing movement of the associated sleeve disposing station to thereby effect cyclic movement of the associated releasably maintaining assembly between its receipt and release positions in correspondence with the cam following movement of the cam follower along the cam.

According to yet further details of the preferred embodiment of the apparatus, each mechanism for guiding an associated releasably maintaining assembly includes at least one slide rod extending generally parallel to the stroke path of the associated releasably maintaining assembly for sliding movement therealong of the associated releasably maintaining assembly, the slide rod guiding the associated releasably maintaining assembly during its cyclic movement between its receipt and release positions. Also, in connection with the feature of the stroke path guiding assembly, each releasably maintaining assembly includes a pair of oppositely movable inner finger members and a pair of oppositely movable outer finger members, each inner finger member being positionable interiorly of a sleeve. The pair of inner finger members are movable in opposite directions when both are disposed interiorly of a sleeve for opening the sleeve to an opened condition and each outer finger member is movable relative to a respective one of inner finger members between a gripping position in which the outer finger member and the respective inner finger member compressively grip the sleeve therebetween and a release position in which the outer finger member is spaced apart from the sleeve.

According to one feature of the control system of the apparatus, there is provided a plurality of cam follower mounting devices, each for slidably mounting the cam follower on the slide rod of the associated releasably maintaining assembly. Each cam follower mounting device is connected to the associated releasably maintaining assembly, whereby each cam follower mounting device travels along the slide rod in correspondence with the cam following movement of associated cam follower and thereby effects movement of the associated releasably maintaining assembly between its receipt and release positions.

According to a further aspect of the present invention, the sleeve is a tubular label having labeling thereon and the apparatus further includes a device for discharging each article unit from the advancing mechanism at an exit location and a device for feeding article units to the advancing mechanism at a feed location and wherein the displacing system is operable to displace each sleeve disposing station through one complete circuit along the travel path including passage of the sleeve disposing stations past the exit location at which an associated article unit that has received thereon a tubular label is discharged from the advancing mechanism and past the feed location at which a new article unit is fed to the advancing mechanism for receiving a sleeve from the sleeve disposing station during the next circuit of the station along the travel path.

DESCRIPTION OF THE PREFERRED EMBODIMENT

Figure 1:
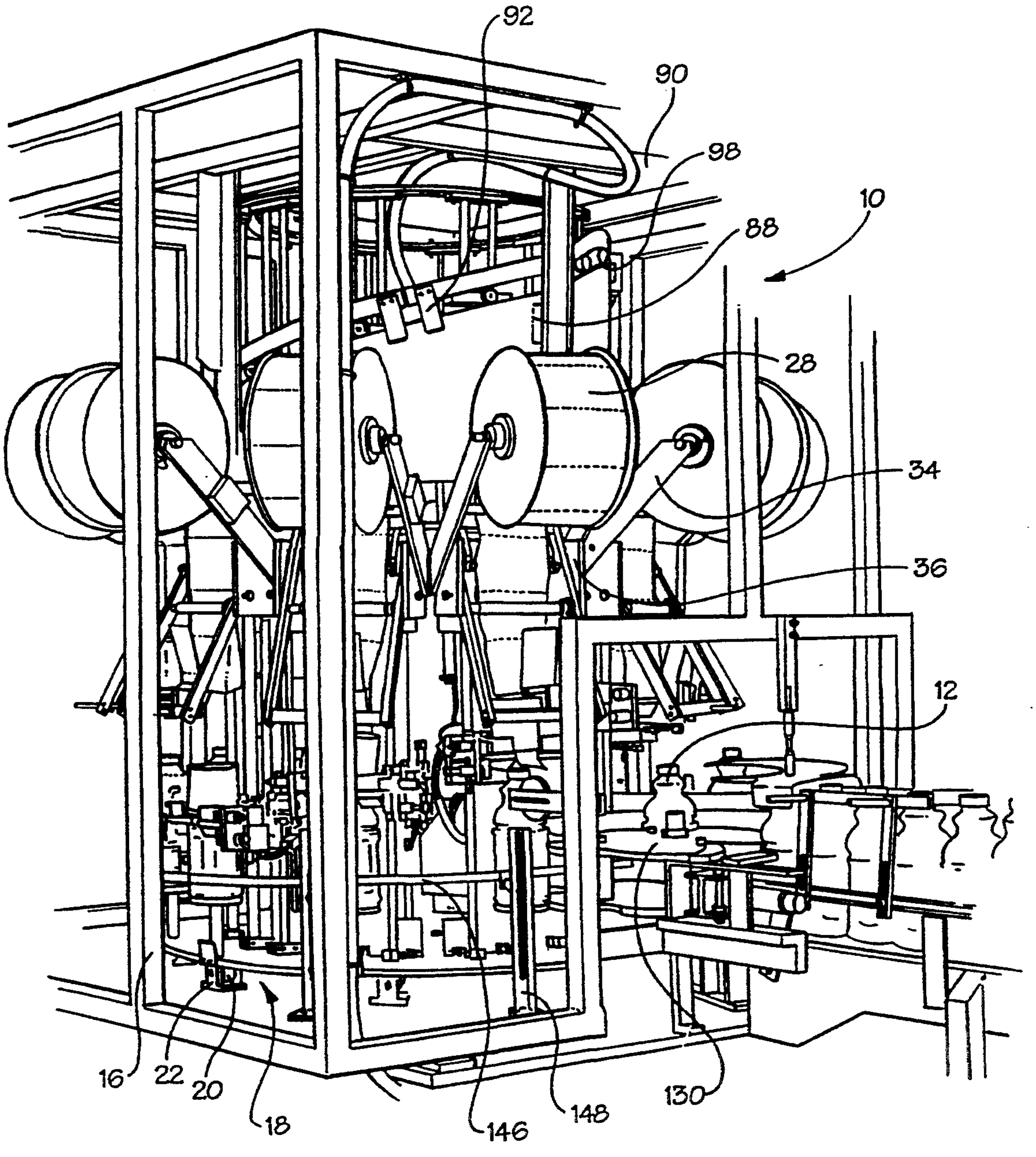
FIG. 1 is a perspective view of the preferred embodiment of the tubular label disposing apparatus of the present invention.

In FIGS. 1–7, the preferred embodiment of the tubular label disposing apparatus of the present invention is illustrated. The tubular label disposing apparatus 10 includes an arrangement for advancing a plurality of article units 12 on a travel path TP along which the article units 12 travel during the individual disposition of a sleeve or tubular label 14 onto each article unit 12. Each article unit 12 may comprise a single article such as, for example, a molded plastic liquid container or beverage bottle, or, alternatively, each article unit 12 may comprise a plurality of individual articles bound together for handling as an integral single element. Preferably, each tubular label 14 has an endless shape and may be comprised of a plastic material having labeling thereon.

The article unit advancing arrangement is preferably in the form of a rotating plate 16 supported for rotation about its axis on a plurality of roller assemblies 18 located in a circular pattern having a diameter slightly less than the diameter of the rotating plate 16. Each roller assembly 18 includes a roller 20 rotatably supported in a bracket 22 and engaging and supporting the underside of the rotating plate 16 to support the rotating plate during rotation thereof.

Figure 2:
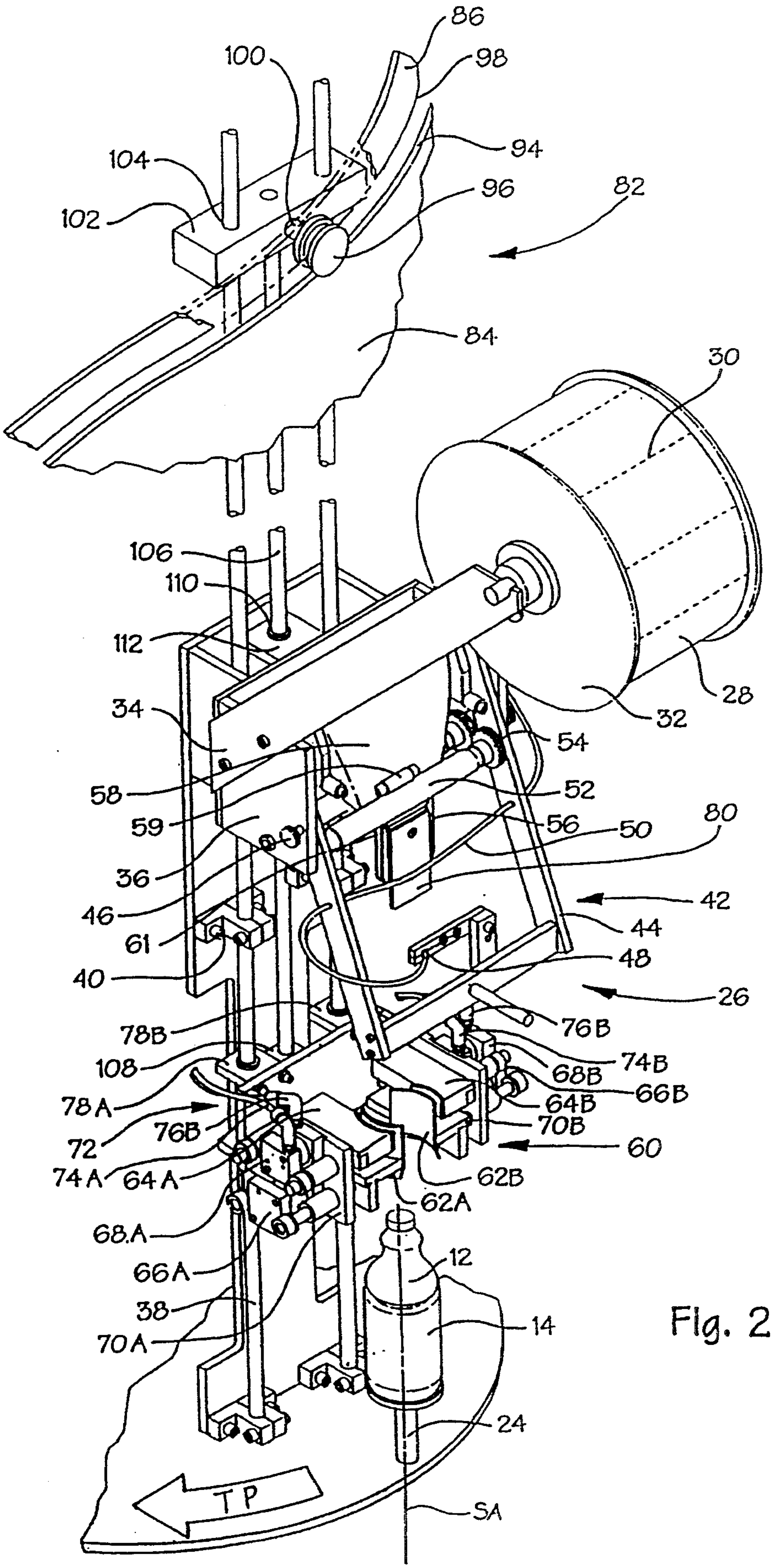
FIG. 2 is an enlarged perspective view of one of the tubular label disposing stations of the apparatus shown in FIG. 1 and showing a portion of a cam track for controlling the label applying and return strokes of the tubular label disposing station.

As best seen in FIG. 2, a plurality of article unit supports 24 are mounted to the rotating plate 16 at uniformly angularly spaced locations thereon. Each article unit support 24 comprises a flat enlarged head co-axially mounted on a post member, for supporting an article unit 12 disposed thereon in a label applying position.

The tubular label disposing apparatus 10 also includes a plurality of tubular label applying stations or labeling heads 26 for individually disposing a tubular label 14 on an article unit 12 as it is advanced along the travel path TP. Each station 26 performs label applying operations in which it engages a tubular label, expands the tubular label into an expanded condition for subsequent insertion movement over an article unit 12, inserts the expanded tubular label relative to the article unit 12 for subsequent release of the tubular label thereonto, and releases the tubular label for slight contracting movement thereof into an encircling mounted position on the article unit. Each station 26 comprises conventional components for engaging, separating, and expanding a tubular label of the type which are disclosed, for example, in U.S. Pat. No. 4,620,888 to Easter et al.

Each tubular label applying station 26 comprises several conventional components such as, for example, a continuous supply web 28 of tubular labels 14 serially connected to one another in separably connectable manner by transverse perforations 30. The present invention also contemplates that the tubular label disposing apparatus 10 can be operated to handle tubular labels which are serially connected to another without any pre-formed separable connections therebetween (e.g., without any perforations). In such a situation, a cutting wheel (not shown) or other device can be provided to separate the tubular labels at an appropriate time during the label dispensing operation. The supply web 28 is wound on a web reel 32 which is rotatably supported by a pair of web reel support brackets 34. As seen in FIG. 1, each web reel support bracket 34 of each tubular label applying station 26 is mounted to one leg of a pinch roller frame 36. The pinch roller frame 36 includes a base portion and a pair of spaced apart legs fixedly mounted to a pair of slide rods 38 associated with the respective tubular label applying station 26. Each pair of slide rods 38 is fixedly mounted to the rotating plate 16 and extends vertically therefrom at a uniform angular spacing from adjacent slide rod pairs. Each of the two slide rods of the pair of slide rods associated with a tubular label applying station 26 is mounted to the rotating plate 16 at a respective angular position thereon relative to the rotation axis of the rotating plate such that the article unit support 24 associated with the respective tubular label applying station 26 lies on a radius of the rotating plate 16 which bisects the two slide rods. The pinch roller frame 36 of each tubular label applying station 26 is fixed mounted to the pair of slide rods 38 by a plurality of rod clamping assemblies 40.

In the preferred embodiment illustrated in FIGS. 1–7, both the article unit supports 24 and the tubular label applying stations 26 are mounted to the rotating plate 16 for movement therewith and the rotating plate therefore serves the dual function of advancing the article units along the travel path TP and displacing each tubular label applying station 26 to travel with an associated article unit 12 during advancing movement thereof along the travel path TP. Since the rotating plate 16 supports each tubular label applying station 26 in fixed relation with the associated article unit support 24 on which the associated article unit 12 is supported during its advancing movement along the travel path TP, the tubular label applying stations 26 are maintained in label applying position relative to the associated article unit 12 throughout the advancing movement of the article unit along the travel path TP. However, the present invention contemplates that the tubular label applying stations 26 can be mounted on a structure separate from the rotating plate 16 with the separate structure serving as a means for displacing each tubular label applying station 26 to travel with an associated article unit 12 during advancing movement of the associated article unit along the travel path TP.

Figure 7:
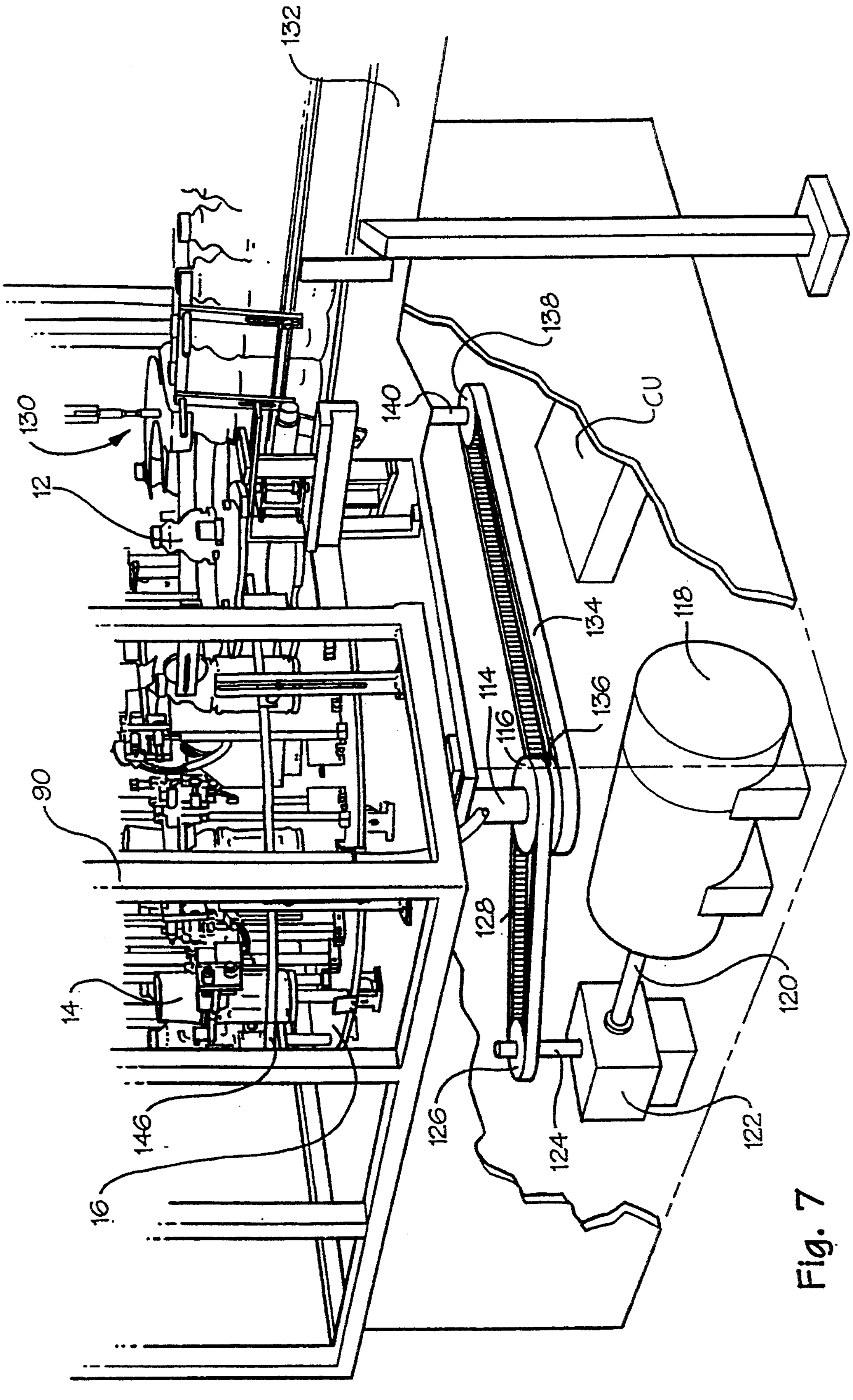
FIG. 7 is a perspective view, in partial vertical section, of a portion of the tubular label disposing apparatus shown in FIG. 1.

A transceiver mounting bracket 42 has a pair of legs 44, each mounted by a pivot (not shown) and a latch 46 to the pinch roller frame 36. The transceiver support bracket 42 supports a conventional photoelectric transceiver 48 which is operatively connected by a connector 50 to a control unit CU, as seen in FIG. 7, for controlling the tubular label supply process in a manner described in more detail below. A nonreflective member 80 is mounted to a guide horn assembly, described in more detail below, for cooperating with the light beam transceiver 48 to detect the feed of a tubular label 14.

Each tubular label applying station 26 also includes a pair of pinch rollers 52 with one of the pinch rollers 52 having each of its ends rotatably mounted to a respective leg of the support bracket 42. Each end of the other pinch roller 52 is rotatably mounted to a respective leg of the pinch roller frame 36. Each pinch roller 52 has a gear 54 fixedly mounted at one end thereof for meshing engagement with the gear 54 of the other pinch roller for coordinated rotation of the pinch rollers 52. The pinch roller 52 mounted to the pinch roller frame 36 is operatively connected to a conventional pinch roller drive motor (not shown) for driving operation of the pinch rollers.

Each tubular label applying station 26 additionally includes a guide horn assembly 56 for opening and prepositioning each tubular label 14 as it is separated from the supply web 28. The guide horn assembly 56 includes a conventional guide horn 58 of predetermined shape selected for opening each tubular label 14 from its normally incompletely opened position on the supply web 28 into an opened position as the tubular label is drawn downwardly over the guide horn 58 in encircling manner. The guide horn assembly 56 is normally disposed in a guiding position in which the guide horn 58 extends through the nip formed between the pair of pinch rollers 52. Each guide horn assembly 56 also includes a first pair of idler rollers 59 mounted on one side of the pinch rollers 52, and a second pair of idler rollers 61 mounted on the other side of the pinch rollers 52, only one roller of each such pair being illustrated in FIG. 2. The idler rollers of each pair of the idler rollers are spaced from one another in correspondence with the diameter of a pinch roller 52 for rolling travel of the pair of idler rollers along the circumference of the pinch rollers 52 during the disposition of the guide horn assembly 56 in its guiding position.

Each tubular label applying station 26 further includes an assembly for releasably maintaining a sleeve in its opened condition during the disposition of the sleeve onto an article unit 12. Each releasably maintaining assembly is preferably in the form of a finger assembly 60 having a pair of opposed inner fingers 62A,62B and a pair of outer grippers or fingers 64A,64B which cooperate in a manner described in more detail below to engage and carry a tubular label 14. Each of the inner fingers 62A,62B is mounted to a compressed air piston assembly 66A,66B, respectively, for selective extension and retraction of the inner finger in a direction transverse to a label applying stroke axis SA. Each of the outer fingers 64A,64B is mounted to a compressed air piston assembly 68A,68B, respectively, for selective extension and retraction of the outer finger in a direction transverse to the stroke axis SA. The compressed air piston assemblies 66A,68A are mounted on one leg 70A of a finger assembly carriage 72 and the compressed air piston assemblies 66B,68B are mounted to another leg 70B of the finger assembly carriage 72. Each slider flange 78A,78B is U-shaped with a pair of legs spaced from one another in the direction of the stroke axis SA. Each of the compressed air piston assemblies 66A, 66B, 68A, and 68B is connected by a compressed air supply line 74A, 74B, 76A, and 76B, respectively, which is connected to a conventional compressed air source (not shown) for supplying compressed air, under the control of the control unit CU, to the compressed air piston assembly.

The finger assembly carriage 72 supports the finger assembly 60 as an integral unit for movement in a direction parallel to the stroke axis SA, and to this end, the finger assembly carriage 72 includes a pair of slider flanges 78A,78B fixedly secured to the finger assembly carriage 72. Each of the legs of the slider flanges 78A,78B has a throughbore formed therein and a bushing mounted in the throughbore. The slider flanges 78A,78B are spaced apart from one another in a direction transverse to the stroke axis SA and a respective one of the slider rods extends through the throughbores and bushings of each slider flange 78A,78B. The slider flanges 78A,78B support the finger assembly carriage 72 for sliding movement along the slide rods 38.

The control unit CU which controls the tubular label engaging and disengaging operation of the finger assemblies 60 comprises one component of a control system for controlling each tubular label applying station 26 to perform a label applying operation during travel of the tubular label applying station with its associated article unit. The control system additionally includes an arrangement for moving each finger assembly carriage 72 relative to the slide rods 38 on which it is mounted along the stroke axis SA in coordination with the advancing movement of the article unit 12 associated with the respective tubular label applying station 26 along the travel path TP. The stroke axis movement arrangement is in the form of a cam track assembly 82 having a lower cam track profile member 84 and an upper cam track profile member 86, both profile members having a circular cross-sectional shape. The lower cam track profile member 84 is mounted by a plurality of mounting brackets 88, as seen in FIG. 1, to a cam track support frame 90 such that the lower cam track profile member 84 is disposed co-axially with respect to the rotating plate 16 and mounted independent thereof. The upper cam track profile member 86 is fixedly mounted to the lower cam track profile member 84 in spaced relation thereto by a plurality of brackets 92.

As seen in FIG. 2, the top edge 94 of the lower cam track profile member 84 is shaped with a predetermined curvature to provide a cam track along which a plurality of cam track followers 96 travel in cam following relationship. Each cam follower 96 is associated with a respective one of the tubular label applying stations 26 and is connected by a structure described in more detail below to the finger assembly carriage 72 of the respective tubular label applying station to effect movement of the finger assembly carriage 72 in its label applying and return strokes. The upper cam track profile member 86 includes a bottom edge 98 having a curvature sufficiently similar to the curvature of the top edge 94 of the lower cam track profile member 84 for cooperating with the lower cam track profile to guide the cam track followers 96.

As seen in FIG. 2, each cam follower 96 is in the form of a wheel having a central portion of a diameter corresponding to the uniform spacing between the top edge 94 of the lower cam track profile member 84 and the bottom edge 98 of the upper cam track profile member 86 for secure rolling travel of the cam follower 96 between the two cam track members 84,86.

A shaft 100 is co-axially fixedly mounted to each cam follower 96 and is rotatably mounted to a cam follower mounting traveler block 102 which includes a pair of throughbores 104 spaced apart from one another at a spacing equal to the spacing between the rods of a pair of the slide rods 38 such that each traveler block 102 is slidably mounted on a respective pair of the slide rods 38. A connecting rod 106 has one end fixedly mounted to the traveler block 102 at a location intermediate its throughbores 104 and has its other end mounted to a connecting flange 108 fixedly mounted to the back side of the finger assembly carriage 72 intermediate the slider flanges 78A,78B. The connecting rod 106 is slidably received in a throughbore 110 formed in a support flange 112 extending from the back side of the pinch roller frame 36.

As seen in FIG. 7, the tubular label disposing apparatus 10 includes means for driving rotation of the rotating plate 16 about its axes, including a shaft 114 co-axially mounted to the rotating plate 16. A driven gear 116 is fixedly mounted to the lower end of the shaft 114. A drive motor 118 includes an output shaft 120. A conventional transmission assembly 122 is operatively connected to the output shaft 120 for transmitting the rotating action of the output shaft 120 to a transmission shaft 124. A drive gear 126 is fixedly mounted to the transmission shaft 124 and a belt 128 is trained around the drive gear 126 and the driven gear 116 for transmitting rotation of the drive gear 126 to the driven gear 116.

Figure 6:
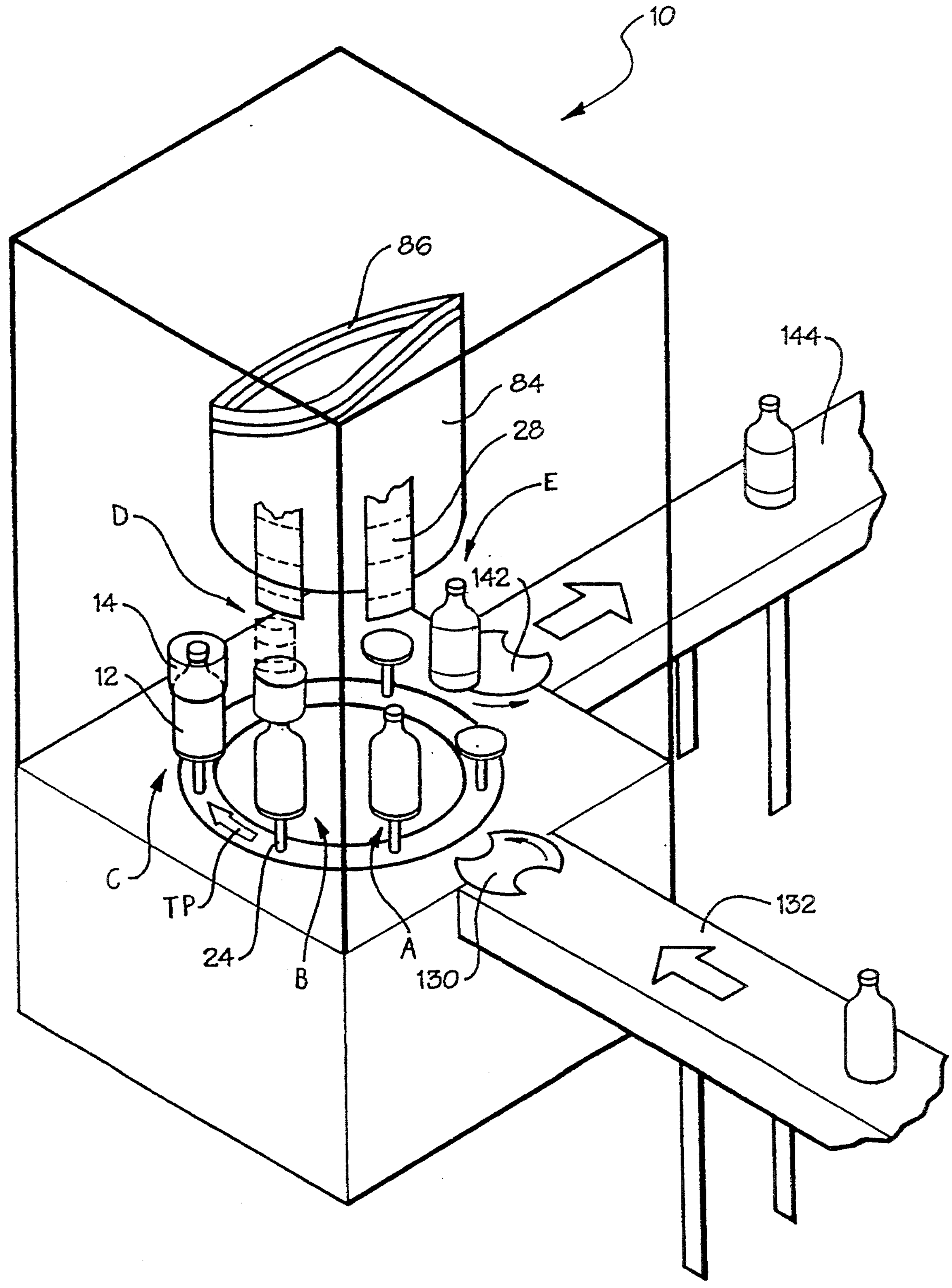
FIG. 6 is a schematic perspective view of selected components of the tubular label disposing apparatus shown in FIG. 1.

As seen in FIGS. 6 and 7, the tubular label applying apparatus 10 also includes a feed mechanism 130 at a loading position for feeding unlabeled containers 12 to the supports 24 in correspondence with the positioning of each support 24 at the loading position. The feed mechanism 130 is preferably in the form of a Geneva-type mechanism which individually transports each unlabeled article unit 12 from a feed belt 132 into the loading position. The Geneva-type mechanism can, if desired, be fed unlabeled article units 12 by a suitable feed device such as, for example, a worm screw-type rotating shaft. As seen in FIG. 7, the driving operation of the Geneva-type mechanism is controlled in response to the drive of the rotating plate 16 by directly coupling the Geneva-type mechanism to the drive components of the rotating plate 16. A take-off belt 134 is trained around a gear 136 co-axially mounted to the driven gear 116 and a driven gear 138 fixedly mounted to the free end of a shaft 140 co-axially mounted to the Geneva-type mechanism. Alternatively, the Geneva-type mechanism can be operatively connected to a separated drive motor (not shown) which rotates the Geneva-type mechanism in coordination with the rotation of the rotating plate 16 such that each article unit 12 completes its travel into the loading position in correspondence with the arrival of a support 24 under the article unit.

The tubular label disposing apparatus 10 also includes a conventional discharge device 142, as illustrated diagrammatically in FIG. 6, for effecting the discharge of the article units 12 from their supported positions on the supports 24 onto a discharge belt 144 in coordination with the positioning of each labeled container 12 at the exit position. The discharge device 142 is preferably a Geneva-type mechanism directly operatively connected to the drive components of the rotating plate 116 in any suitable manner for driving operation of the discharge device in coordination with the driving rotation of the rotating plate 16.

As seen in FIGS. 1 and 7, the tubular label disposing apparatus 10 also includes an annular guide rail 146 supported on a plurality of posts 148 generally at the vertical level of the article units 12 for engaging the article units as they are advanced in the path TP to enhance the stability of the article units on the article units supports 24.

The curvature of the cam track formed by the bottom edge 98 and the top edge 94 is selected to control the vertical movement of each cam follower 96 in correspondence with the displacing movement of the tubular label applying stations 26 by the rotating plate 16. Due to the interconnected relationship of each cam follower 96 and its associated finger assembly carriage 72, the associated finger assembly carriage 72 cyclically moves through its label applying stroke and return stroke along the associated pair of the slider rods 38 in correspondence with the cam following movement of the cam follower 96. As seen in FIG. 6, the cam track forms an endless path having changes of slope at selected positions for guiding each cam follower 96 through selected rises and falls during one complete revolution of the rotating plate 16 to thereby control all of the vertical movements of the finger assembly carriage 72 associated with the cam follower.

Figure 4:
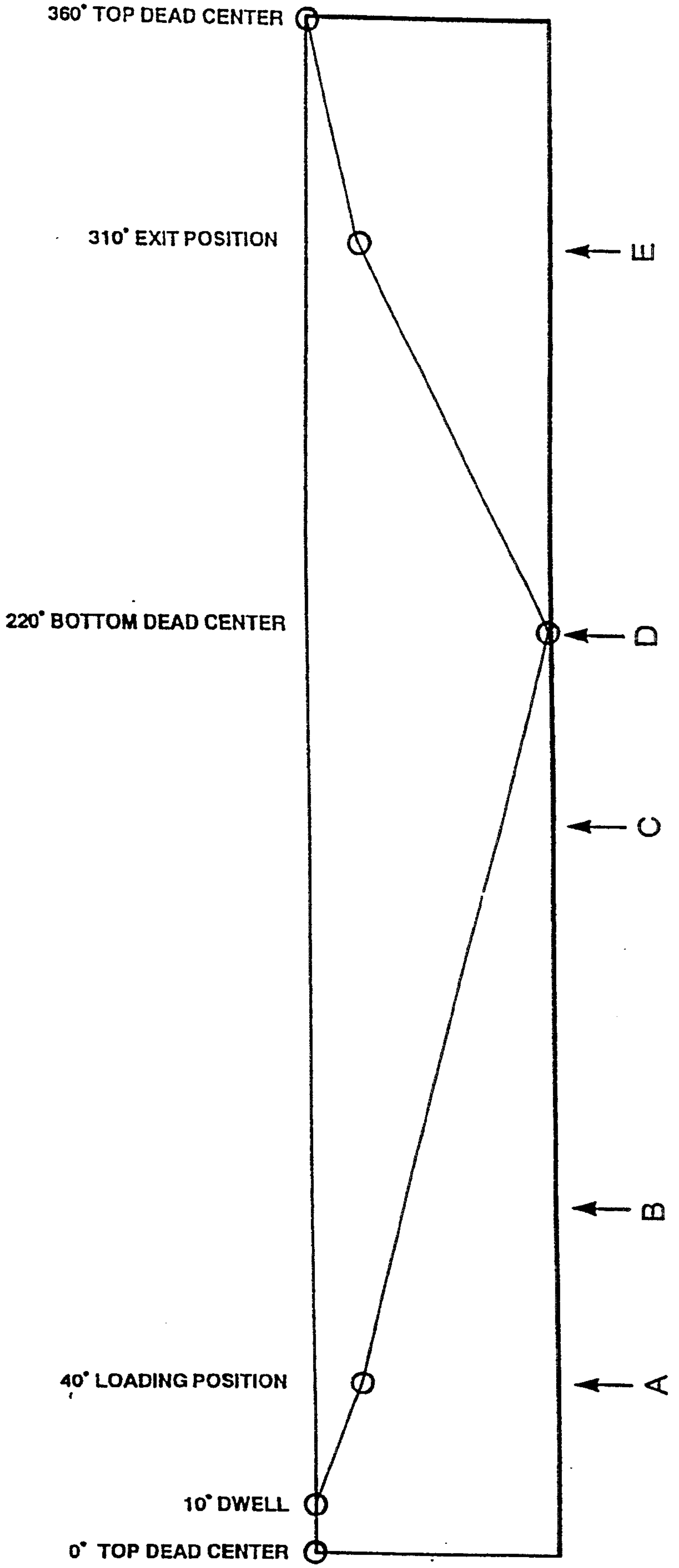
FIG. 4 is a graphical representation in linear form of the endless path of the cam track shown in FIG. 2.
Figure 5:
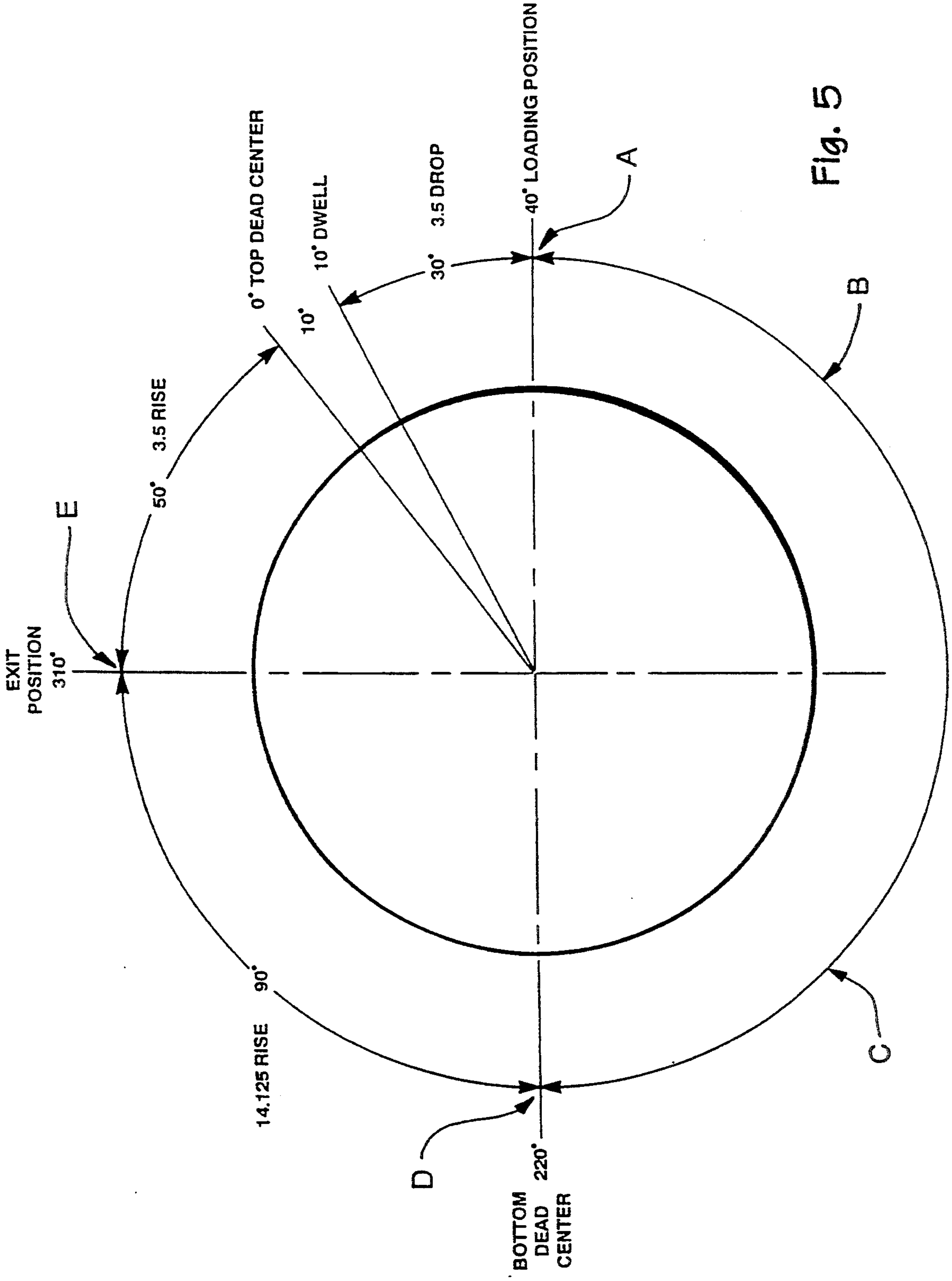
FIG. 5 is a graphical representation of the cam track shown in FIGS. 2 and 4 showing the angular positions of several changes of slope of the cam track.

The cam following travel of the cam follower 96 and the corresponding vertical movement of the finger assembly carriage 72 is discussed with reference to FIGS. 3A–3 and 4–6. FIGS. 3A–E each depict the respective instantaneous position of a finger assembly carriage 72 at a selected instantaneous cam following position of the associated cam follower 96 along the cam track. FIG. 4 is a graphic representation in linear form of the travel path of each cam follower 96 follows as it travels along the cam track. FIG. 5 is a graphical representation of the respective slopes and changes in slope of the cam track throughout its 360° endless path.

Figure 3A:
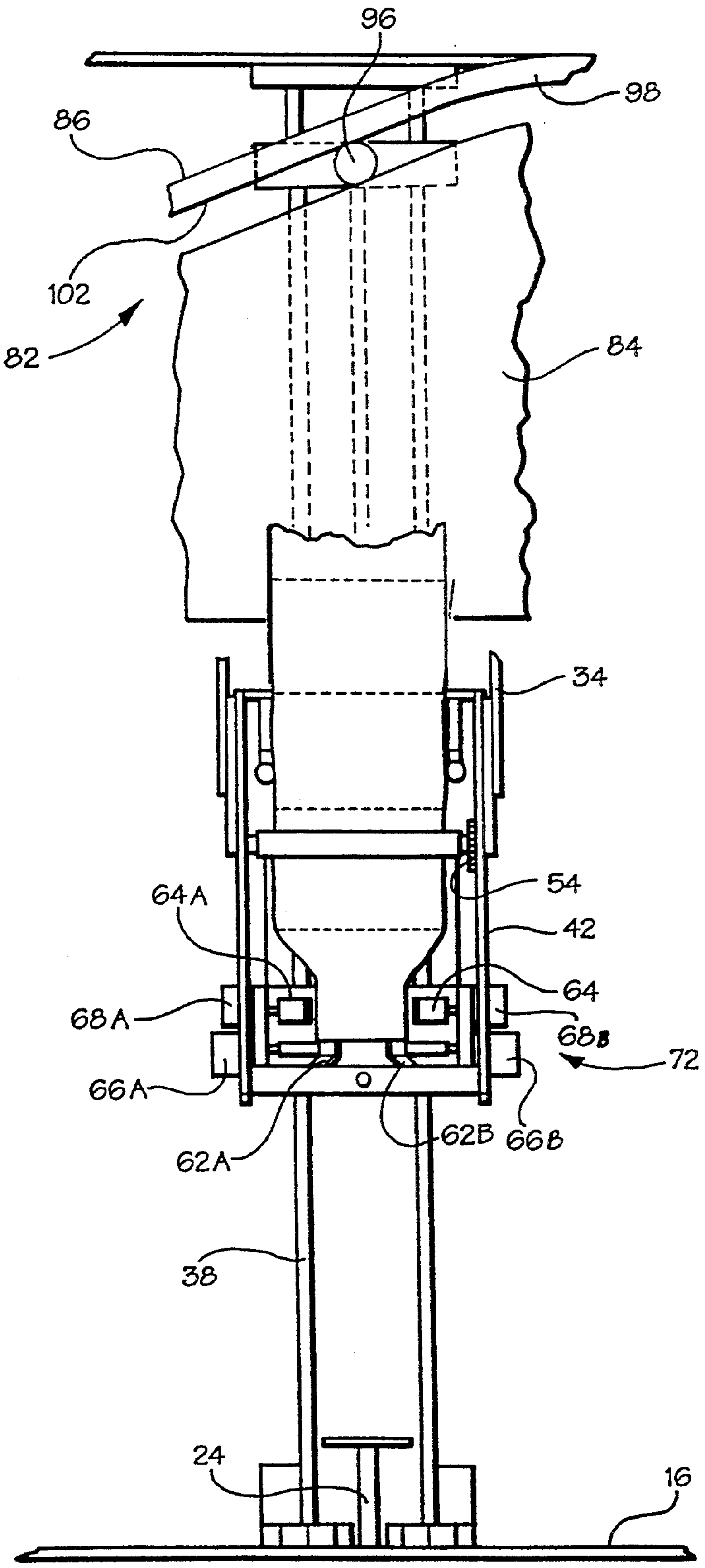
FIGS. 3A–E are each an enlarged front elevational view of one of the tubular label disposing stations of the apparatus shown in FIG. 1 and illustrating a plurality of different positions of the tubular label applying station which it assumes during a label applying operation.

As seen in FIG. 3A, when each cam follower 96 is displaced 40° from the top dead center (the 0° position of the cam track), the associated finger assembly carriage 72 is positioned sufficiently above an associated article unit support 24 to allow an article unit 12 to be loaded by the feed mechanism 130 onto the support without interference with the finger assembly 60. The arrows A in FIGS. 4 and 5 indicate the position of each cam follower 96 at the loading position. The arrow A in FIG. 6 indicates the associated article unit support 24 supporting an article unit 12 thereon immediately after loading of the article unit 12 onto the support 24 by the feed mechanism 130 at the loading position.

Figure 3B:
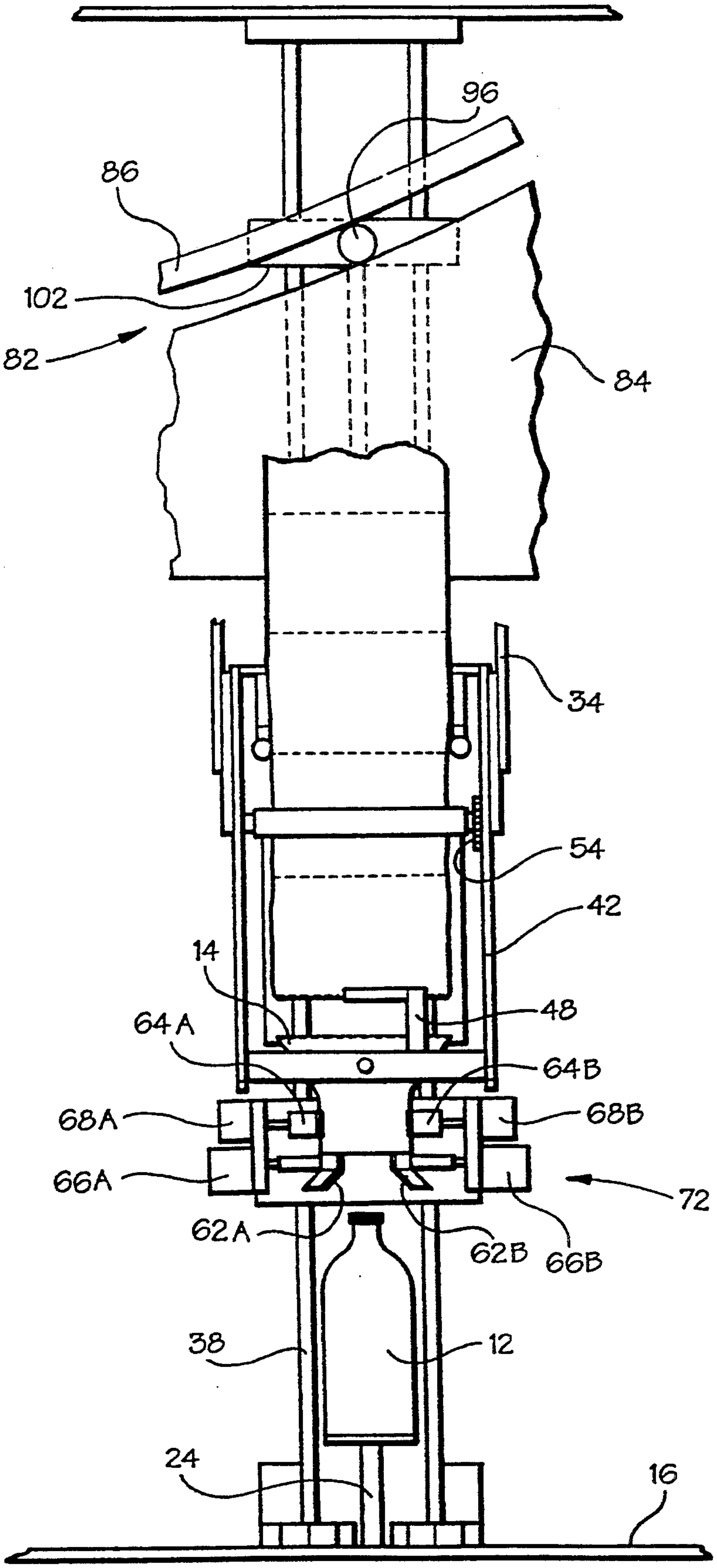

FIG. 3B illustrates the respective instantaneous position of each finger assembly carriage 72 after the inner finger 62A,62B and the outer fingers 64A,64B of the respective finger assembly have engaged and separated a label 14 from the supply web 28 and before the finger assembly carriage 72 has traveled downwardly along the slide rods 38 below the top of the article unit 12 which is to be labeled. The arrows B in FIGS. 4 and 5 indicate the respective travel location of each cam follower 96 at the instantaneous position of the cam follower shown in FIG. 3B and the arrow B in FIG. 6 indicates the article unit 12 and the separated label 14 at this respective instantaneous position of the cam follower 96.

Figure 3C:
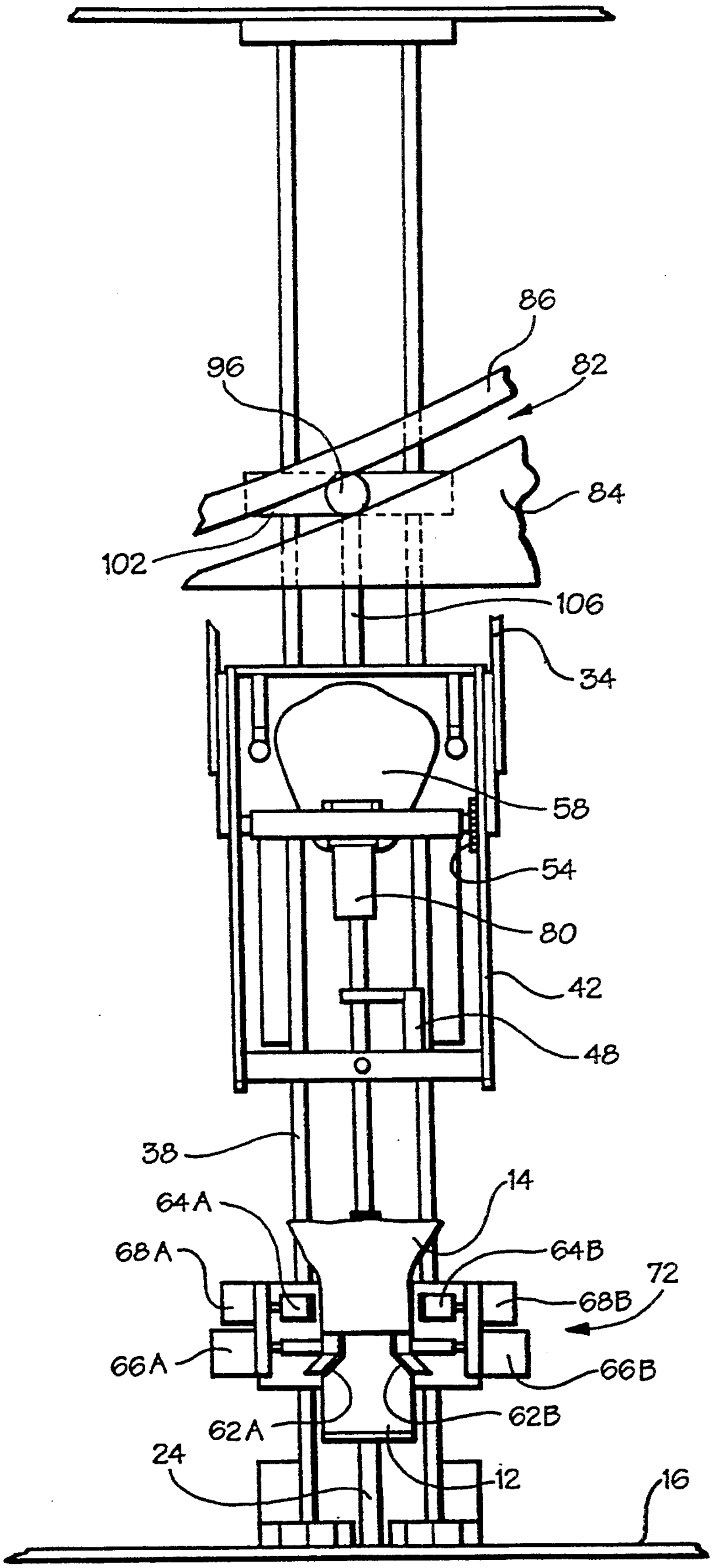

FIG. 3C illustrates the instantaneous positions of each cam follower 96 and its associated finger assembly carriage 72 at a point in time during a label applying operation in which the finger assembly carriage 72 has traveled downwardly beyond the top of the article unit 12 to effect drawing of the label 14 thereover. The arrows C in FIGS. 4 and 5 show the respective travel location of the cam follower 96 at the instantaneous position of the cam follower shown in FIG. 3C. FIG. 6 indicates the label 14 and the article unit 12 at the point in time in which the cam follower 96 and the finger assembly carriage 72 have reached their respective positions as shown in FIG. 3C.

Figure 3D:
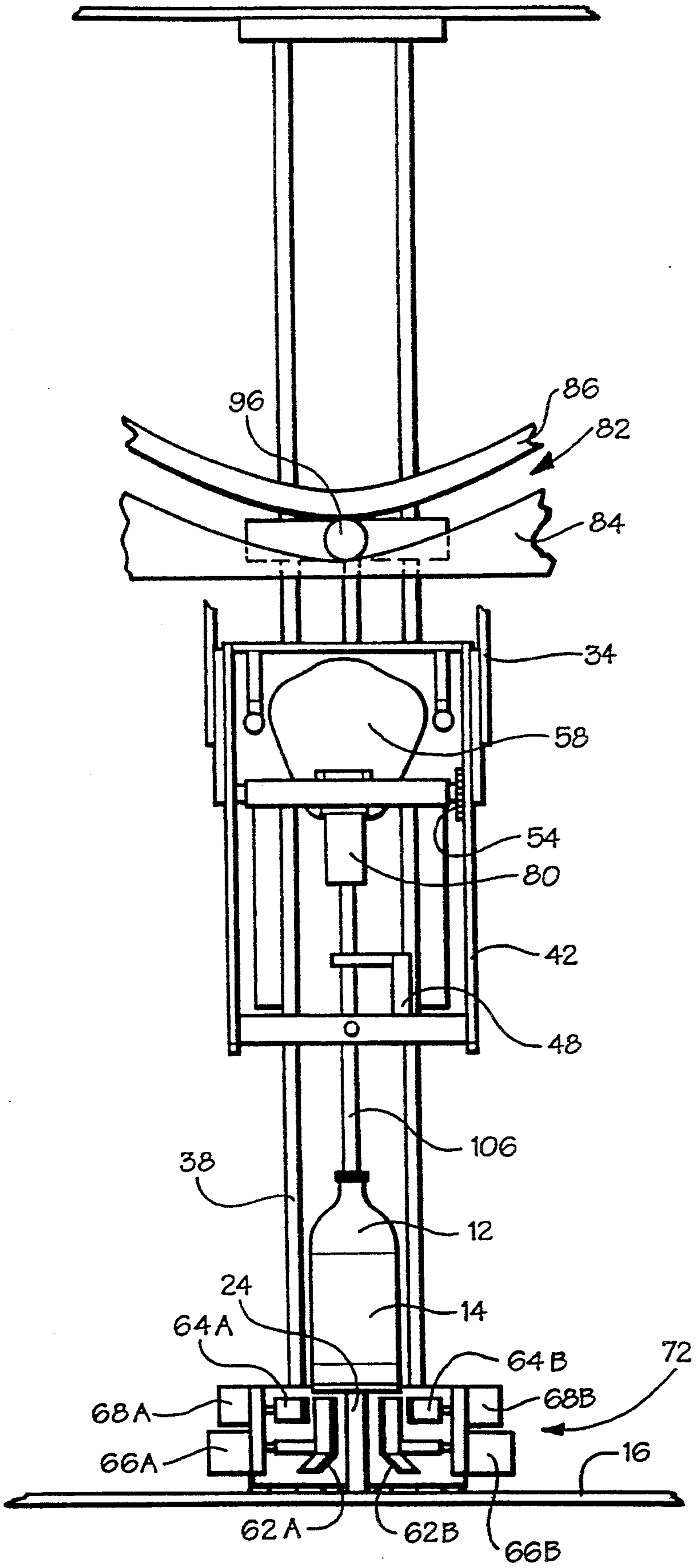

FIG. 3D illustrates the respective instantaneous positions of each cam follower 96 and each finger assembly carriage 72 at a point in time after the inner fingers 62A,62B and the outer fingers 64A,64B have traveled downwardly beyond the label 14 and before the finger assembly carriage 72 has begun its upward stroke movement. This position corresponds to the bottom dead center position of the cam track which is 180° displaced from its top dead center position and the arrows D in FIGS. 4 and 5 indicate the respective travel position of the cam follower 96 at the point in time of the label applying operation at which the cam follower 96 and the finger assembly carriage 72 are at their respective instantaneous positions in FIG. 3D. The arrow D in FIG. 6 indicates the article unit 12 and the label 14 thereon at its respective instantaneous position of the cam follower 96.

Figure 3E:
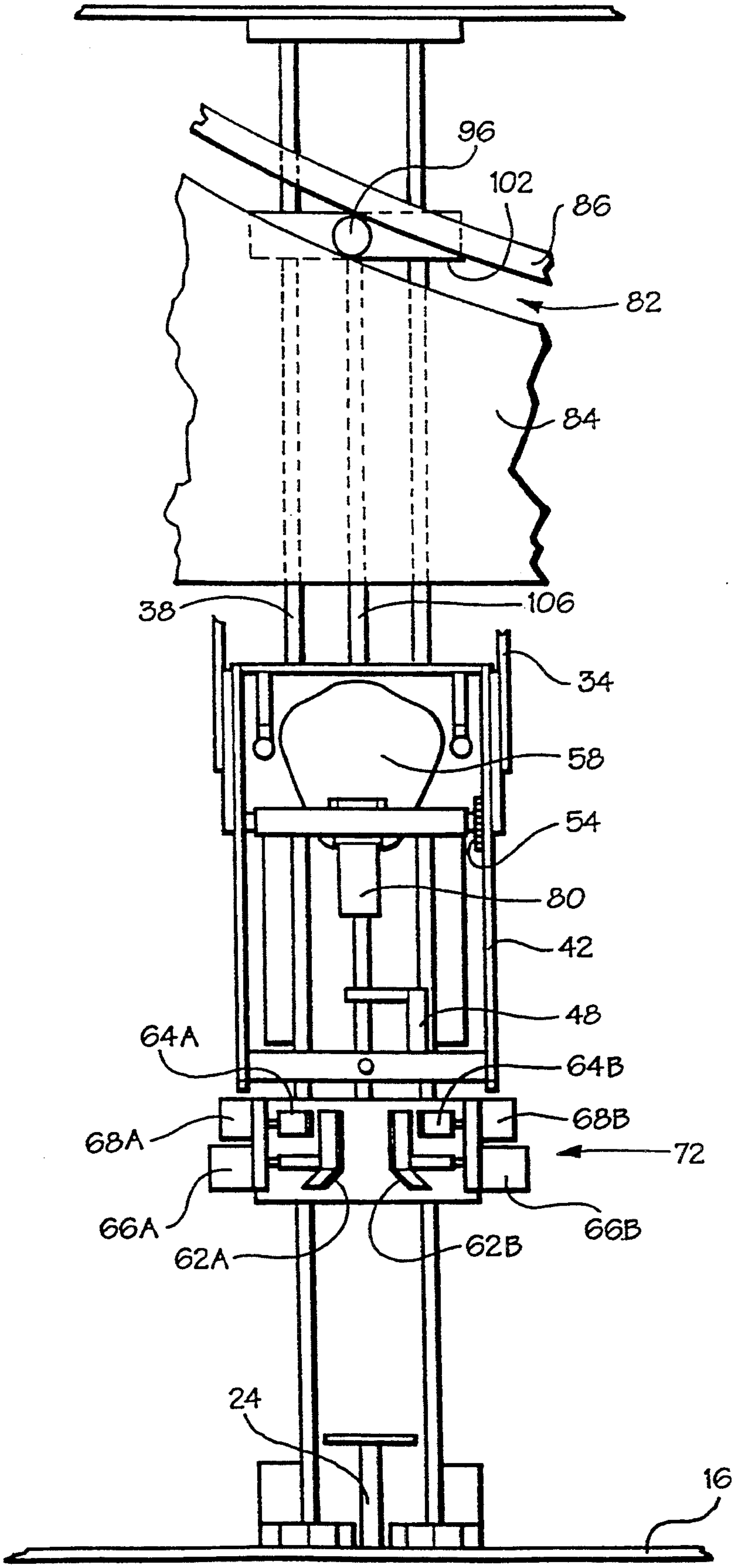

FIG. 3E illustrates the respective instantaneous positions of each cam follower 96 and its associated finger assembly carriage 72 at a point in time during the label applying operation after the article unit 12 which has just received a label from the respective label applying station has been discharged from the support 24 and before the label applying station has again reached the loading position for receiving another article unit 12 to be labeled. The arrows E in FIGS. 4 and 5 designate the relative travel position of the cam follower 96 on the cam travel path at this point in the label applying operation. The arrow E in FIG. 6 indicates the article unit 12 at its arrival at the discharge location.

The tubular label disposing apparatus 10 operates as follows to continuously dispose tubular labels on article units. The article units 12 are supplied by the feed belt 132 to the feed mechanism 130 for individual loading of the article units onto the article units supports 24 in coordination with the rotation of the rotating plate 16. As each article unit 12 is thereafter advanced along the travel path TP, the cam follower 96 of the respective tubular label applying station 26 follows the cam track and thereby effects movement of the finger assembly carriage 72 of the tubular label applying station along the stroke axis SA. As described in connection with FIG. 3A, each finger assembly carriage 72 is positioned above the associated article unit support 24 as an article unit 12 is loaded thereon and, in coordination with the loading of the article unit 12 onto the support 24, the control unit CU controls the supply of compressed air to the finger assembly 60 to cause the finger assembly 60 to engage the next available tubular label 14. The control unit CU responds to the signals from the photoelectric transceiver 48, which emits a light beam that is interrupted by the passage therepast of the respective tubular label 14 being engaged by the finger assembly and reflected back at a higher intensity than it is otherwise reflected by the non-reflective member 80. The control of a finger assembly to engage a tubular label and to effect separation of the tubular label from the adjacent label is well known in the art, as evidenced, for example, by U.S. Pat. No. 4,620,888 to Easter et al or British Patent Specification 1 596 969, which are both hereby incorporated by reference herein.

As described with respect to FIG. 3B, the cam follower 96 continues to effect downward movement of the finger assembly carriage 72 along the stroke axis SA. In coordination with the downward movement of the finger assembly carriage 72, the control unit CU controls the pinch rollers 52 to clamp the respective tubular label separably connected to the tubular label 14 engaged by the finger assembly 60. Since the respective contiguous tubular label is clamped by the pinch rollers 52 at the same time that the engaged tubular label 14 is moved downwardly, the engaged tubular label 14 separates from the adjacent tubular label along the perforation 30 formed therebetween. The continued downward movement of the finger assembly carriage 72 effects downward movement of the engaged, now separated tubular label 14, as shown by the arrow B in FIG. 6.

As the engaged tubular label 14 initially engages the respective article unit 12 on which it is to be disposed, the engaged tubular label 14 opens from its partially opened position to a fully opened, annular shape as it conforms to the overall annular shape of the article unit. In correspondence with the movement of the engaged tubular label 14 into the preferred axial position on the respective article unit 12 at which it is to be disposed, the control unit CU controls the supply of compressed air to the outer fingers 64A,64B to effective retraction of the outer fingers from their clamping positions with the inner fingers 62A,62B, respectively, as shown in FIG. 3C. Thereafter, only the inner fingers 62A,62B remain in engagement with the tubular label 14.

As the finger assembly carriage 72 completes its downward movement along the stroke axis SA, the inner surface of the tubular label 14 has frictionally engaged the respective article unit 12 and assumed its encircling mounted disposition on the article unit while the inner fingers 62A,62B move downwardly out of engagement with the tubular label 14. FIG. 3D illustrates the finger assembly carriage 72 at its lowermost position during its label applying stroke with the inner fingers 62A,62B out of engagement with the tubular label 14.

The finger assembly carriage 72 now begins its return stroke upwardly along the stroke axis SA and the rate of rise of the finger assembly carriage 72 is selected such that it is at a vertical level above the respective article unit 12 as the article unit reaches the discharge position at which it is engaged by the discharge device 142 for discharge onto the discharge belt 144. After the discharge of the associated article unit 12, the finger assembly carriage 72 continues to rise upwardly on its return stroke along the stroke axis SA in coordination with the rotation of the respective tubular label applying station 26 between the discharge location and the feed location.

The present invention also contemplates that the tubular label disposing apparatus 10 can be provided with suitable conventional and other structures for facilitating the safe and reliable operation of the apparatus. For example, a backlog sensing means in the form of a photoelectric beam-emitting mechanism can be disposed at a suitable location such as, for example, at a location downstream of the discharge device 142, for detecting a backlog or other disruption in the orderly conveyance of the article units 12 away from the tubular label disposing apparatus 10. The photoelectric beam-emitting mechanism can be configured to emit a beam at an angle across the travel path of the discharged article units 12 to detect the presence of a stationary article unit, the stationary status of the article unit being evaluated as an indication that the movement of the article units has been interrupted. In such event, a shutdown mechanism operatively connected to the photoelectric beam-emitting mechanism can be configured to stop the operation of the tubular label disposing apparatus 10 so that further article units 12 are not discharged in a backup situation.

Appropriate protective structures such as, for example, clear, rigid plastic sheets, can be secured to the cam track support frame 90 to prevent access to the rotating plate 16 and the components supported thereon during rotating operation of the rotating plate. If desired, the protective plastic sheets can be hingedly supported on the cam track support frame 90 or a separate frame to permit opening of the plastic sheets for access to the tubular label disposing apparatus 10. Appropriate sensing mechanisms can be provided to automatically shut down the operation of the tubular label disposing apparatus 10 in the event one of the protective plastic sheets is opened during operation of the apparatus.

If the tubular label disposing apparatus 10 is used in an environment in which the article units 12 arrive already filled with beverage or another liquid, spillage of the beverage or liquid may occur during the label applying operation and the spilled beverage or liquid may detrimentally interfere with the smooth operation of the tubular label disposing apparatus. For example, spilled beverage or liquid on a tubular label 14 may cause the tubular label to adhere to the inner fingers 62A,62B even after the inner fingers have traveled downwardly to the position illustrated in FIG. 3D immediately prior to the return stroke of the finger assembly carriage 72.

In this situation, the tubular label, which has assumed its encircling mounted position on the article 12, may travel upwardly with the inner fingers 62A,62B as the finger assembly carriage 72 moves upwardly in its return stroke, whereby both the tubular label and the article unit will be raised by the finger assembly carriage with consequent detrimental interruption of the label applying operation. To alert an operator to the occurrence of such a situation or to shut down the operation of the tubular label disposing apparatus to thereby permit an operator to remedy the interruption, an appropriate sensing mechanism can be disposed at each tubular label applying station 26. For example, a mechanical-type detector can be provided having a trigger extending into the travel path of an article unit 12 which is raised from its support 24 due to, for example, adherence of the tubular label on the article unit to the inner fingers 62A,62B or a photoelectric switch can be provided having an interruptable beam of light. In the event that an article unit 12 is raised by the finger assembly carriage 72, the trigger of the mechanical-type detector will be moved, thereby providing a signal for alerting an operator and/or shutting down the operation of the tubular label disposing apparatus 10.

The plurality of tubular label applying stations 26 thus continuously perform label applying operations as the rotating plate 16 rotates about its axis with each tubular label applying station receiving a fresh article unit 12 from the feed mechanism 130 during passage therepast and discharging an article unit with a tubular label 14 disposed thereon at the discharge location during each passage therepast. Since the article units 12 are continuously fed onto the article unit supports 24, the tubular label disposing apparatus 10 of the present invention advantageously optimizes the rate at which tubular labels are disposed on the article units. Each article unit 12 is fed onto a single article unit support 24 at the single feed location and this feature advantageously eliminates the need for coordinating the feed of several article units to a plurality of tubular label applying stations during each cycle of label applying operations for a group of article units. Thus, the tubular label applying apparatus of the present invention avoids the need to precisely align a group of article units for subsequent feeding to label applying stations, such as is the situation in prior art arrangements in which a group of article units are fed along a linear feed to a group of tubular label applying stations for groupwise application of labels to the article units. Moreover, the tubular label disposing apparatus of the present invention optimizes the rate at which tubular labels can be separated from the supply webs without detrimental plastic deformation such as, for example, permanent axial elongation, of the labels. The optimization of the rate of separation of the tubular labels is accomplished by the configuration of the tubular label disposing apparatus of the present invention to control a plurality of tubular label applying stations to separate labels from the respective supply webs at staggered intervals.

The present invention also contemplates that the tubular label disposing apparatus 10 can be provided with improvements or enhancements which improve the efficiency and safety of the operation of the apparatus. For example, conventional overload clutch safeties can be provided to automatically de-activate the rotation of the rotating plate 16 in the event that resistance to rotation is detected above a predetermined level such as may occur, for example, due to one of the article units 12 being thrown from its respective article unit support 24 into a position in which the article unit jams or binds the rotating plate 16. Also, appropriate conventional detectors can be disposed at the feed location for providing information to the control unit for controlling the operation of the tubular label disposing apparatus 10 in two situations: the situation in which no article unit 12 is available for feeding by the feed mechanism 130 and the situation in which one of the tubular label applying stations has exhausted its supply of the tubular labels 14. If the detector detects that no article unit is available for feeding, the control unit can be configured to disable or prevent any one of the tubular label applying stations from accepting an article unit for a tubular label applying operation. Likewise, if a respective tubular label applying station has exhausted its supply of the tubular labels 14, the control unit 60 can be configured to control the respective tubular label applying station to prevent acceptance thereby of any article unit 12.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for disposing a preformed sleeve in encircling relation on an article unit, the sleeve having an endless shape and being openable for insertion of the sleeve onto an article unit, the apparatus comprising:

means for advancing article units along a travel path during the disposition of sleeves thereon;

a plurality of sleeve disposing stations, each station having an individual supply of said preformed tubular sleeves, and each station individually disposing a sleeve on an article unit during said advancing movement of the article unit along the travel path, each sleeve disposing station being operable to perform a sleeve disposing operation in which the sleeve disposing station engages a sleeve, expands the sleeve into an opened condition, positions the opened sleeve relative to an article unit for subsequent release thereonto, and releases the sleeve to assume an encircling mounted position on the article unit;

means for displacing each sleeve disposing station to travel with an associated article unit during said advancing movement of the associated article unit along the travel path such that the sleeve disposing station is maintained in sleeve disposing position relative to the associated article unit; and means for controlling each sleeve disposing station to perform a sleeve disposing operation by which a sleeve is disposed on the associated article unit during travel of the sleeve disposing station with the associated article unit, whereby a sleeve is disposed on each article unit by one of the sleeve disposing stations during the advancing movement of the article unit along the travel path.

2. An apparatus for disposing a sleeve in encircling relation on an article unit according to claim 1, wherein the article unit advancing unit includes means for advancing for the article units along an endless travel path.

3. An apparatus for disposing a sleeve in encircling relation on an article unit according to claim 1, wherein the controlling means includes means for driving each sleeve disposing means through its sleeve disposing operation in response to the movement of the sleeve disposing means by the displacing means.

4. An apparatus for disposing a sleeve in encircling relation on an article unit according to claim 1, wherein each sleeve disposing means includes an assembly for releasably maintaining a sleeve in an opened condition and wherein the controlling means includes a plurality of stroke path movement means, each for cyclically moving a releasably maintaining assembly along a stroke path between a receipt position at which the releasably maintaining assembly receives a sleeve and a release position at which the releasably maintaining assembly releases the sleeve to assume its encircling mounted position on an article unit.

5. An apparatus for disposing a sleeve in encircling relation on an article unit according to claim 4, wherein the controlling means includes means for controlling each stroke path movement means to cyclically move its associated releasably maintaining means between its receipt position and its release position in response to the displacing movement of the respective sleeve disposing means.

6. An apparatus for disposing a sleeve in encircling relation on an article unit according to claim 5 wherein the means for advancing articles along a travel path includes a rotatable support means having a plurality of individual article unit support positions uniformly circumferentially spaced from one another along a circle and means for rotating the rotatable support means, each individual article unit support position being arranged for supporting a respective article unit during rotating movement of the rotatable support means whereby the travel path of the article units is an circular travel path.

7. An apparatus for disposing a sleeve in encircling relation on an article unit according to claim 6 wherein the means for displacing each sleeve disposing station includes station support means for supporting the sleeve disposing stations on the rotatable support means in sleeve disposing relation with the articles supported on the rotatable support means.

8. An apparatus for disposing a sleeve in encircling relation on an article unit according to claim 6 wherein the controlling means includes cam means forming a cam and each stroke path movement means includes a cam follower connected to the associated releasably maintaining assembly, and means for guiding the associated releasably maintaining assembly during its movement between its receipt position and its release position, each cam follower being operable to follow the cam during displacing movement of the associated sleeve disposing station to thereby effect cyclic movement of the associated releasably maintaining assembly between its receipt and release positions in correspondence with the cam following movement of the cam follower along the cam.

9. An apparatus for disposing a sleeve in encircling relation on an article unit according to claim 5 wherein the controlling means includes cam means forming a cam and each stroke path movement means includes a cam follower connected to the associated releasably maintaining assembly and means for guiding the associated releasably maintaining assembly during its movement between its receipt position and its release position, each cam follower being operable to follow the cam during displacing movement of the associated sleeve disposing station to thereby effect cyclic movement of the associated releasably maintaining assembly between its receipt and release positions in correspondence with the cam following movement of the cam follower along the cam.

10. An apparatus for disposing a sleeve in encircling relation on an article unit according to claim 9 wherein each means for guiding an associated releasably maintaining assembly includes at least one slide rod extending generally parallel to the stroke path of the associated releasably maintaining assembly for sliding movement therealong of the associated releasably maintaining means, the slide rod guiding the associated releasably maintaining means during its cyclic movement between its receipt and release positions.

11. An apparatus for disposing a sleeve in encircling relation on an article unit according to claim 10 wherein each releasably maintaining assembly includes a pair of oppositely movable inner finger members and a pair of oppositely movable outer finger members, each inner finger member being positionable interiorly of a sleeve and the pair of inner finger members being movable in opposite directions when both are disposed interiorly of a sleeve for opening the sleeve to an opened condition, and each outer finger member being movable relative to a respective one of inner finger members between a gripping position in which the outer finger member and the respective inner finger member compressively grip the sleeve therebetween and a release position in which the outer finger member is spaced apart from the sleeve.

12. An apparatus for disposing a sleeve in encircling relation on an article unit according to claim 10 and further comprising a plurality of cam follower mounting means, each for slidably mounting the cam follower on the slide rod of the associated releasably maintaining means, and each cam follower mounting means being connected to the associated releasably maintaining means, whereby each cam follower mounting means travels along the slide rod in correspondence with the cam following movement of associated cam follower and thereby effects movement of the associated releasably maintaining means between its receipt and release positions.

13. An apparatus for disposing a sleeve in encircling relation on an article unit according to claim 2 wherein the sleeve is a tubular label having labeling thereon, and further comprising means for discharging each article unit from the advancing means at an exit location, and means for feeding article units to the advancing means at a feed location, and wherein the displacing means is operable to displace each sleeve disposing station through one complete cycle along the travel path including passage of the sleeve disposing stations past the exit location at which an associated article unit onto which the sleeve disposing station has released a tubular label is discharged from the advancing means and past the feed location at which a new article unit is fed to the advancing means for receiving a sleeve from the sleeve disposing station during the next circuit of the station along the travel path.

14. An apparatus for disposing a sleeve in encircling relation on an article unit according to claim 13 wherein the advancing means includes a plurality of article unit support positions each for individually supporting an article unit and each article unit is a bottle.

15. An apparatus for disposing a preformed tubular label in encircling relation on an article unit, the tubular label having an endless shape and being expanded into an opened condition for insertion of the tubular label onto an article unit, the apparatus comprising:

a rotatable support member having a plurality of individual article unit support positions disposed on a circle at uniform circumferential spacings from one another each article unit support position being arranged for supporting an article unit during the disposition of a tubular label thereon;

means for rotating the rotatable support member;

a plurality of tubular label disposing stations, each station having its own individual supply of said preformed tubular labels, and each station individually disposing a tubular label on an article unit during movement of the article unit by the rotatable support member, each tubular label disposing station being operable to perform a tubular label disposing operation in which it engages a tubular label, expands the tubular label into an opened condition, positions the opened tubular label relative to an article unit for subsequent release thereonto, and releases the tubular label to assume an encircling mounted position on the article unit, the tubular label disposing stations being mounted to the rotatable support member at positions thereon corresponding to the article unit support positions such that each tubular label disposing station is in sleeve disposing relation to an article unit during rotation of the rotatable support member and includes an assembly for releasably maintaining a tubular label in an opened condition, each releasably maintaining assembly being movable between a receipt position at which it receives a tubular label and a release position at which it releases the tubular label to assume its encircling mounted position on an article unit;

cam means including an annular member having a cam formed thereon and means for mounting the annular member independently of the rotatable support member to permit rotation of the rotatable support member relative to the annular member, the annular member being mounted generally coaxial with the rotatable support member and the cam having a profile which rises and falls in a predetermined manner relative to the direction of movement of the releasably maintaining assemblies; and a plurality of cam followers, each connected to a respective one of the releasably maintaining assemblies and being disposed for cam following travel along the cam during rotating movement of the respective releasably maintaining assembly by the rotatable support member, whereby each cam follower effects cyclic movement of the respective releasably maintaining assembly between its receipt and release positions as the cam follower rises and falls during its cam following travel along the cam.

16. An apparatus as defined in claim 1 wherein said individual supply of preformed tubular sleeves includes a roll of such sleeves having a diameter less than said articles and being formed of a material having sufficient resiliency to permit said sleeve to be temporarily opened to a diameter greater than the diameter of said article when said sleeve is expanded into said opened condition by said sleeve.

17. An apparatus as defined in claim 15 wherein said individual supply of preformed tubular labels includes a roll of such labels having a diameter less than said articles and being formed of a material having sufficient resiliency to permit said label to be temporarily opened to a diameter greater than the diameter of said article when said label is expanded into said opened condition by said label.

18. An apparatus for disposing a preformed tubular sleeve in encircling relation on an article unit, the sleeve having a diameter less than the diameter of said article unit and being openable and stretchable for insertion of the sleeve onto an article unit, the apparatus comprising:

means for advancing article units along a travel path during the disposition of sleeves thereon;

a roll of said preformed tubular sleeves arranged in end-to-end relation on said roll;

a plurality of sleeve disposing stations, each station individually disposing a sleeve on an article unit during said advancing movement of the article unit along the travel path, each sleeve disposing station being operable to perform a sleeve disposing operation in which the sleeve disposing station engages a sleeve and separating it from said roll, expands the sleeve to stretch said sleeve into an opened condition having a diameter greater than said article units, positions the opened sleeve relative to an article unit for subsequent release thereonto, and releases the sleeve to assume an encircling mounted position on the article unit;

means for displacing each sleeve disposing station to travel with an associated article unit during said advancing movement of the associated article unit along the travel path such that the sleeve disposing station is maintained in sleeve disposing position relative to the associated article unit; and means for controlling each sleeve disposing station to perform a sleeve disposing operation by which a sleeve is disposed on the associated article unit during travel of the sleeve disposing station with the associated article unit, whereby a sleeve is disposed on each article unit by one of the sleeve disposing stations during the advancing movement of the article unit along the travel path.

* * * * *